(12) United States Patent
Hogan

(10) Patent No.: US 11,745,926 B2
(45) Date of Patent: Sep. 5, 2023

(54) MULTI-LAYER PRODUCTS

(71) Applicant: MEDI-Clear Ltd, Hull (GB)

(72) Inventor: Mark Paul Hogan, Hull (GB)

(73) Assignee: MEDI-CLEAR LTD, Hull (GB)

( * ) Notice: Subject to any disclaimer, the term of this patent is extended or adjusted under 35 U.S.C. 154(b) by 220 days.

(21) Appl. No.: 17/081,046

(22) Filed: Oct. 27, 2020

(65) Prior Publication Data

US 2021/0155390 A1 May 27, 2021

(30) Foreign Application Priority Data

Nov. 26, 2019 (GB) .................................... 1917193
Dec. 23, 2019 (GB) .................................... 1919192

(51) Int. Cl.
*B65B 7/01* (2006.01)
*B05D 1/02* (2006.01)
(Continued)

(52) U.S. Cl.
CPC .............. *B65D 75/327* (2013.01); *B32B 3/06* (2013.01); *B32B 3/266* (2013.01); *B32B 7/06* (2013.01); *B32B 7/12* (2013.01); *B32B 15/043* (2013.01); *B32B 15/08* (2013.01); *B32B 15/12* (2013.01); *B32B 17/10* (2013.01); *B32B 27/08* (2013.01);
(Continued)

(58) Field of Classification Search
CPC ............ B65D 75/3278; B65D 2585/56; B65D 2575/3236; B32B 2439/80; B32B 2439/70; B32B 2435/02; B32B 2307/748; B32B 2307/732; B32B 2307/7246; B32B 2307/412; B32B 2255/28; B32B 225/26; B32B 2255/12; B32B 2255/10; B32B 225/06; B32B 43/006; B32B 27/32; B32B 29/005; B32B 27/08; B32B 17/10;
(Continued)

(56) References Cited

U.S. PATENT DOCUMENTS 7,984,807 B2 * 7/2011 Elliott ...................... A61J 1/03
206/532
2004/0182738 A1 * 9/2004 Williams-Hartman ......................
B65D 75/36
206/531

(Continued)

FOREIGN PATENT DOCUMENTS

| CN | 108211108 A | 6/2018 |
| WO | 2005023670 A1 | 3/2005 |

OTHER PUBLICATIONS

Combined Search and Examination Report for Great Britain Application No. GB1917193.3, published by the United Kingdom Intellectual Property Office, dated May 26, 2020, 5 pages.
(Continued)

*Primary Examiner* — Ellen S Hock
(74) *Attorney, Agent, or Firm* — Kilyk & Bowersox, P.L.L.C.

(57) ABSTRACT

A seal for use with a container for storing and dispensing consumer products is described. The seal includes a cover layer having pre-formed lines of separation defining one or more releasable portions, an adhesive layer on the cover layer, and one or more patches on the adhesive layer. Each patch is associated with a respective one of the releasable portions 6 and consists of a hot melt polymer. The hot melt polymer can be applied to the adhesive layer using a suitable coating or spraying process.

6 Claims, 7 Drawing Sheets

(51) Int. Cl.
| | |
|---|---|
| B65D 75/32 | (2006.01) |
| B32B 3/06 | (2006.01) |
| B32B 3/26 | (2006.01) |
| B32B 7/06 | (2019.01) |
| B32B 7/12 | (2006.01) |
| B32B 15/04 | (2006.01) |
| B32B 15/08 | (2006.01) |
| B32B 15/12 | (2006.01) |
| B32B 17/10 | (2006.01) |
| B32B 27/08 | (2006.01) |
| B32B 27/32 | (2006.01) |
| B32B 29/00 | (2006.01) |
| B32B 43/00 | (2006.01) |

(52) U.S. Cl.
CPC ............ *B32B 27/32* (2013.01); *B32B 29/005* (2013.01); *B32B 43/006* (2013.01); *B32B 2255/06* (2013.01); *B32B 2255/10* (2013.01); *B32B 2255/12* (2013.01); *B32B 2255/26* (2013.01); *B32B 2255/28* (2013.01); *B32B 2307/412* (2013.01); *B32B 2307/414* (2013.01); *B32B 2307/7246* (2013.01); *B32B 2307/732* (2013.01); *B32B 2307/748* (2013.01); *B32B 2435/02* (2013.01); *B32B 2439/40* (2013.01); *B32B 2439/70* (2013.01); *B32B 2439/80* (2013.01); *B65D 2575/3236* (2013.01); *B65D 2585/56* (2013.01)

(58) Field of Classification Search
CPC ....... B32B 15/12; B32B 15/08; B32B 15/043; B32B 7/12; B32B 7/06; B32B 3/266; B32B 3/06

See application file for complete search history.

(56) References Cited

U.S. PATENT DOCUMENTS

| | | |
|---|---|---|
| 2018/0319533 A1 | 11/2018 | Hogan |
| 2019/0151197 A1 | 5/2019 | Hogan |
| 2019/0248558 A1 | 8/2019 | Hogan et al. |
| 2019/0329933 A1 | 10/2019 | Hogan |
| 2020/0115074 A1 | 4/2020 | Hogan |

OTHER PUBLICATIONS

Extended European Search Report for European Patent Application No. 20203057.3, dated Mar. 17, 2021, with annex and related documents (6 pages).

* cited by examiner

MULTI-LAYER PRODUCTS

CROSS-REFERENCE TO RELATED APPLICATIONS

The present application claims priority to United Kingdom Patent Application No. GB 1917193.3 filed on Nov. 26, 2019, and to United Kingdom Patent Application No. GB 1919192.3 filed on Dec. 23, 2019, all of which are incorporated herein by reference in their entirety.

FIELD OF THE INVENTION

The invention relates to multi-layer products, and in particular to multi-layer products that can be used as a seal for use with a container for storing and dispensing consumer products. The term consumer products is intended to cover a wide variety of products as illustrated by the following (non-exhaustive) list: foods, either for immediate consumption, pre-cooked, prepared or oven ready, including prepared meals, confectionary, hardware and DIY items, cosmetics, seeds, animal and fish feeds, electronic components, medical appliances and dressings, medicines and medication such as pills, tablets and capsules.

BACKGROUND OF THE INVENTION

Self-adhesive (or pressure sensitive) labels typically comprise a first layer (often referred to as a face material), an adhesive layer, and a second layer (often referred to as a liner or backing). The adhesive layer is arranged between the first layer and the second layer. Cut lines are provided in the first layer to define the periphery of individual labels. The first layer can include cut lines that define two or more labels. The labels can be arranged in an array on a single sheet or in the form of a roll that might be used with automated label applicator machines, for example. The cut lines can be formed using a die cutter and normally extend all of the way through the first layer and may penetrate part of the way into the adhesive layer, but not into the second layer.

The first and second layers can be formed of any suitable material. A common material is paper but plastics such as polypropylene (PP) and polyethylene terephthalate (PET) are often used to provide improved resistance to tearing. The first layer may itself comprise two or more separate layers—e.g., a cover layer with provides printable surface and a barrier layer to which the adhesive layer is applied.

A release layer or coating is applied to a surface of the second layer to allow the self-adhesive labels to be removed easily and cleanly from the second layer. Once a label is removed from the second layer, the exposed adhesive on its underside allows the label to be adhered to a surface as required.

The release coating can be made of any suitable material, but silicone-based coatings are commonly used.

For some applications, cut lines can also be provided in the second layer to define the periphery of individual liner portions. The second layer can include cut lines that define two or more liner portions. Often, each liner portion will be associated with a corresponding label. The cut lines in the second layer can be formed using a die cutter and normally extend all of the way through the second layer and may penetrate part of the way into the adhesive layer, but not into the first layer.

WO 2005/023670 describes a seal for use with a container for storing and dispensing consumer products. The container may be used in place of conventional blister packs for the packaging of pills, tablets and capsules, or may be used for organizing and storing mixed medication for subsequent dispensation according to a predefined dosage regimen. The principle behind such mixed medication containers is that a dosage regimen of mixed medication can be organized in advance for a period of a week or more, and a patient or nurse can then remove from the container, at predefined times over the said period, the one or more pills, tablets and/or capsules to be administered on each occasion according to the dosage regimen.

The container includes a tray having a generally planar top surface into which has been formed an array of discrete cavities for receiving the consumer products.

The seal is generally similar in construction to the self-adhesive labels described above. In particular, the seal includes a first layer (or cover film) that is adhered to the generally planar top surface of the tray by a layer of adhesive to seal the cavities to retain the consumer products in the cavities. The cover film is often a flexible sheet of plastics material. The cover film has pre-formed lines of separation defining a releasable portion per cavity to retain the consumer products in that cavity until it is removed. The cover film therefore has a corresponding array of releasable portions. Each line of separation can be a tear line (e.g., a score line or perforation line) that must be torn or broken to release the releasable portion, or a cut line extending completely through the material of the cover film. Each releasable portion of the cover film has low vapour transmission properties in the area which in use overlies the associated cavity, those low vapour transmission properties being created by a barrier patch with high vapour barrier properties shaped and sized to overlie the associated cavity. Each barrier patch is adhered to the underside of the cover film by the same layer of adhesive as that which adheres the cover film to the top surface of the tray.

The array of barrier patches is created from a single sheet of barrier film (or second layer) as follows. A single sheet of barrier film is adhered to the underside of the cover film by the adhesive layer to form the seal. The barrier film is often a flexible sheet of plastics material. The barrier film has pre-formed lines of separation (e.g., tear lines such as score lines or perforation lines, or cut lines) defining the periphery of each vapour-resistant barrier patch so that peeling away the majority of the barrier film from the cover film immediately prior to application of the cover film to secure it to the generally planar top surface of the tray exposes the adhesive in areas necessary for adhesion to the tray. If the lines of separation are tear lines they will tear when the barrier film is removed to leave a barrier patch attached to the underside of each releasable portion of the cover film.

In a preferred arrangement, the barrier patches are larger than the associated releasable portions of the cover film and are adhered to an overlapping region of the cover film between the pre-formed line of separation in the cover film and the periphery of the associated barrier patch. The barrier patches are not adhered to the generally planar surface of the tray, but only to the cover film.

The cover film is secured to the tray by the same layer of adhesive that is used to secure the cover film to the barrier film. After the majority of the barrier film has been peeled away from the cover film to expose the adhesive, the cover film can be secured to the top surface of the tray. Although not described in WO 2005/023670, the skilled person will understand that a release layer or coating will normally be applied to a surface of the barrier film so that it can be released easily from the adhesive layer when the majority of the barrier film is removed to leave the individual barrier patches.

It can be seen that there are broad similarities between the self-adhesive label and the seal described above. In particular, the releasable portions of the cover film correspond generally to the individual labels cut in the first layer (or face material) of the self-adhesive label stock and the barrier patches correspond generally to the liner portions. The only difference is that in the case of the seal, the majority of the barrier film is peeled away from the cover film to allow the cover film to be adhered to the generally planar top surface of the tray using the exposed adhesive on the underside of the cover film. The releasable portions in the cover film are only removed or released from the remainder of the cover film when the contents of the underlying cavity are to be dispensed.

SUMMARY OF THE INVENTION

The present invention provides a multi-layer product comprising:

a first layer having pre-formed lines of separation defining one or more first portions;

an adhesive layer on the first layer; and one or more patches on the adhesive layer, each patch being associated with a respective one of the one or more first portions and consisting of a hot melt polymer.

The first layer can have a first surface (e.g., an upper surface that defines an upper surface of the multi-layer product) and a second surface (e.g., a lower surface to which the adhesive layer is applied).

The first layer can be any suitable material of single or multiple-layer construction, e.g., a paper sheet, a metal foil such as aluminum foil, a metallized polymeric film or paper sheet, a plastics film such as a flexible sheet of polypropylene or polyethylene terephthalate, or any combination thereof.

The or each line of separation in the first layer can be formed by a pre-scored or pre-perforated tear line, a cut line, or a combination thereof. Lines of separation can be formed using any suitable cutting process, for example using die cutters. The or each line of separation can be a continuous line of separation or can include a gap defining a bridge region that allows the associated first portion to remain physically attached to the remainder of the first layer when it has been released by tearing or separating along the pre-formed line of separation.

Each patch can be aligned with the associated first portion of the first layer and can be of any suitable shape. If the multi-layer product includes a plurality of patches, for example, an array of patches corresponding to an array of first portions of the first layer, the patches will define discrete "mesas" surrounded by the adhesive layer.

The or each patch will preferably be non-tacky.

Depending on the hot melt polymer used, the or each patch can be transparent, translucent or opaque with a suitable color aspect.

The or each patch can be larger than the associated first portion of the first layer. In this case, when a first portion is removed or released from the remainder of the first layer, the respective patch will normally break or rupture—typically along a line that corresponds generally to the pre-formed line of separation of the associated first portion—such that an inner portion of the patch is removed or released along with the first portion and an outer peripheral portion of the patch remains adhered to the adhesive layer. The or each patch can also be the same size as the associated first portion of the first layer, or smaller than the associated first portion of the first layer—i.e., so that each patch is completely contained within the line of separation of the associated first portion.

If the or each patch is larger than the associated first portion of the first layer, each line of separation in the first layer can be a pre-perforated tear line or a cut line that extends completely through the first layer and the adhesive layer, and can extend partly into the underlying patch as long as its structural integrity is not affected. A larger patch will also provide enhanced moisture-barrier properties because any moisture that travels through the pre-perforated tear line or cut line in the first layer must travel outwardly through the adhesive layer to reach the outer peripheral edge of the patch.

The or each patch can be applied to the adhesive layer using any suitable process such as a coating or spraying process for hot melt polymers. In one arrangement, one or more coating heads or spray heads can be used to apply hot melt polymer to the adhesive layer to form an array of discrete patches of pre-determined size and shape. The coating heads or spray heads are preferably connected by hoses to a source of hot melt polymer (e.g., a hot melt polymer supply unit) and are preferably controlled by a suitable controller, e.g., a pattern controller which can typically operate in different modes and determines the size and shape of the patches applied by the coating heads or spray heads. During the coating or spraying process, the adhesive layer (and first layer) may be moved relative to the one or more coating heads or spray heads, e.g., using a transfer roller system. The relative speed of the adhesive layer can be measured and used by the controller to adjust the application of the hot melt polymer during the coating or spraying process. Using a coating or spraying process can be cost-effective and avoids the need to define patches from a separate layer of material, e.g., a flexible plastics sheet, the majority of which is then peeled away to expose the adhesive layer.

The coating or spraying process can be carried out before or after the cutting process as required. If the coating or spraying process is carried out after the cutting process, there is no risk of each line of separation extending partly into an underlying larger patch and affecting its structural integrity.

The or each patch can have a thickness in the range of about 10 to about 50 µm, and more preferably about 15 and about 40 µm.

Any suitable hot melt polymer can be used, including a hot melt polymer that might typically be used as a hot melt adhesive. For example, hot melt polymers based on ethylene-vinyl acetate (EVA), polyurethanes or functional polyolefins might be suitable for certain applications.

The hot melt polymer can be a food-grade polymer.

Any suitable adhesive can be used for the adhesive layer.

The multi-layer product can include a second layer and a release layer between the second layer and the adhesive layer and the one or more patches. The second layer can have a first surface (e.g., a lower surface that defines a lower surface of the multi-layer product) and a second surface (e.g., an upper surface to which the release layer is applied). The release layer contacts the adhesive layer and the one or more patches. The second layer acts as a backing layer to cover the adhesive layer that surrounds the one or more patches and can be peeled away with the release layer to expose the adhesive layer. Any suitable release layer or coating can be used, e.g., a commercially available silicone-based release layer that can be applied to the second surface of the second layer.

The second layer can be any suitable material of single or multiple-layer construction, e.g., a paper sheet, a metal foil such as aluminum foil, a metallized polymeric film or paper sheet, a plastics film such as a flexible sheet of polypropylene or polyethylene terephthalate, or any combination thereof.

The multi-layer product can be a self-adhesive label or a seal for use with a container for storing and dispensing consumer products, for example.

The present invention provides a method of making a multi-layer product, comprising the steps of:

applying an adhesive layer to a surface of a first layer;

applying a hot melt polymer to a surface of the adhesive layer to define one or more patches; and cutting at least the first layer to define pre-formed lines of separation defining one or more first portions, each first portion being associated with a respective one of the one or more patches.

The step of cutting the first layer can be carried out before or after the step of applying the hot melt polymer to the surface of the adhesive layer. In other words, the lines of separation can be formed using any suitable cutting process, for example using die cutters, before the patches are applied to the adhesive layer or after the patches have been applied to the adhesive layer.

The hot melt polymer can be applied to the adhesive layer using any suitable process such as a coating or spraying process—see above.

Other features of the multi-layer product can be as defined above.

The present invention provides a seal for use with a container for storing and dispensing consumer products comprising a tray having a generally planar top surface into which has been formed one or more discrete cavities for receiving the consumer products, the seal comprising:

a cover layer to seal the one or more cavities to retain the consumer products in the one or more cavities when secured to the generally planar top surface of the tray, the cover film having pre-formed lines of separation defining a releasable portion per cavity;

an adhesive layer on the cover layer; and one or more patches on the adhesive layer, each patch being associated with a respective one of the releasable portions and consisting of a hot melt polymer.

The cover layer can have a first surface (e.g., an upper surface that defines an upper surface of the seal) and a second surface (e.g., a lower surface to which the adhesive layer is applied).

The cover layer can be any suitable material of single or multiple-layer construction, e.g., a paper sheet, a metal foil such as aluminum foil, a metallized polymeric film or paper sheet, a plastics film such as a flexible sheet of polypropylene or polyethylene terephthalate, or any combination thereof.

The or each line of separation in the cover layer can be formed by a pre-scored or pre-perforated tear line, a cut line, or a combination thereof. Lines of separation can be formed using any suitable cutting process, for example using die cutters. The or each line of separation can be a continuous line of separation or can include a gap defining a bridge region that allows the associated releasable portion to remain physically attached to the remainder of the cover layer when it has been released by tearing or separating along the pre-formed line of separation. Each releasable portion can be larger than the open mouth of the associated discrete cavity that it overlies in use—i.e., so that the pre-formed line of separation is positioned above the generally planar top surface of the tray. Each releasable portion can also be the same size as, or smaller than, the open mouth of the associated discrete cavity that it overlies in use.

Each patch can be aligned with the associated releasable portion of the cover layer and can be of any suitable shape. If the multi-layer product includes a plurality of patches, for example, an array of patches corresponding to any array of releasable portions of the cover layer, the patches will define discrete "mesas" surrounded by the adhesive layer.

The or each patch will preferably be non-tacky and will prevent the consumer products in the discrete cavities from sticking to the adhesive layer when the seal is adhered to the generally planar top surface of the tray.

The or each patch can be larger than the associated releasable portion of the cover layer. In this case, when a releasable portion is removed or released from the remainder of the cover layer, the respective patch will normally break or rupture—typically along a line that corresponds generally to the pre-formed line of separation of the associated releasable portion—such that an inner portion of the patch is removed or released along with the releasable portion and an outer peripheral portion of the patch remains adhered to the adhesive layer. Each patch can also be the same size as the associated releasable portion of the cover layer, or smaller than the associated releasable portion of the cover layer—i.e., so that each patch is completely contained within the line of separation of the associated releasable portion.

If the or each patch is larger than the associated releasable portion of the cover layer, each line of separation in the cover layer can be a pre-perforated tear line or a cut line that extends completely through the cover layer and the adhesive layer, and can extend partly into the underlying patch as long as its structural integrity is not affected. This allows cutting tolerances to be accommodated. A larger patch will provide enhanced moisture-barrier properties because any moisture that travels through the pre-perforated tear line or cut line in the cover layer must travel outwardly through the adhesive layer to reach the outer peripheral edge of the patch. This can help prevent moisture from entering the discrete cavities and damaging the consumer products. A seal where the or each patch is smaller than the associated releasable portion can also provide enhanced moisture-barrier properties if the lines of separation that define each releasable portion are positioned over the generally planar top surface of the tray such that moisture that travels through the pre-perforated tear line or cut line in the cover layer must travel inwardly through the adhesive layer to reach the discrete cavities.

Each patch can be larger than the open mouth of the associated discrete cavity that it overlies in use—i.e., so that the extends above the generally planar top surface of the tray. Each patch can also be the same size as, or smaller than, the open mouth of the associated discrete cavity that it overlies in use.

The or each patch can be applied to the adhesive layer using any suitable process such as a coating or spraying process for hot melt polymers. Further details of the coating or spraying process are explained above.

The or each patch can have a thickness in the range of about 10 to about 50 μm, and more preferably about 15 and about 40 μm.

Any suitable hot melt polymer can be used—see examples above.

The hot melt polymer can be a food-grade polymer.

Any suitable adhesive can be used for the adhesive layer.

The seal can include a backing layer and a release layer between the backing layer and the adhesive layer and the one or more patches. The backing layer can have a first surface (e.g., a lower surface that defines a lower surface of the seal before it is peeled away from the cover layer) and a second surface (e.g., an upper surface to which the release layer is applied). The release layer contacts the adhesive layer and the one or more patches. The backing layer covers the adhesive layer that surrounds the one or more patches and can be peeled away with the release layer to expose the adhesive layer and allow the cover layer to be adhered to the generally planar top surface of the tray. Any suitable release layer or coating can be used, e.g., a commercially-available silicone-based release layer that can be applied to the second surface of the second layer.

The backing layer can be any suitable material of single or multiple-layer construction, e.g., a paper sheet, a metal foil such as aluminum foil, a metallized polymeric film or paper sheet, a plastics film such as a flexible sheet of polypropylene or polyethylene terephthalate, or any combination thereof.

The present invention provides a method of making a seal for use with a container for storing and dispensing consumer products, comprising the steps of:

applying an adhesive layer to a surface of a cover layer;
applying a hot melt polymer to a surface of the adhesive layer to define one or more patches; and
cutting at least the cover layer to define pre-formed lines of separation defining one or more releasable portions, each releasable portion being associated with a respective one of the one or more patches.

The step of cutting the cover layer can be carried out before or after the step of applying the hot melt polymer to the surface of the adhesive layer. In other words, the lines of separation can be formed using any suitable cutting process, for example using die cutters, before the patches are applied to the adhesive layer or after the patches have been applied to the adhesive layer.

The hot melt polymer can be applied to the adhesive layer using any suitable process such as a coating or spraying process—see above.

Other features of the seal can be as defined above.

The present invention further provides a container for storing and dispensing consumer products, comprising:

a tray having a generally planar top surface into which has been formed one or more discrete cavities for receiving the consumer products; and a seal as described above where the cover layer is secured to the generally planar top surface of the tray by the adhesive layer to seal the one or more cavities to retain the consumer products in the one or more cavities.

The or each releasable portion and its associated patch will overlie a respective discrete cavity of the tray.

The container can be a multiple-compartment container for containing and dispensing medication according to a pre-defined dosage regimen.

BRIEF DESCRIPTION OF THE DRAWINGS

The present invention can be even more fully understood with the reference to the accompanying drawings which are intended to illustrate, not limit, the present invention.

DETAILED DESCRIPTION OF THE INVENTION

Although the following description relates to a seal for use with a multiple-compartment dispensing container, it will be readily understood that the same features can be applied to other multi-layer products such as self-adhesive labels, for example.

Figure 1:
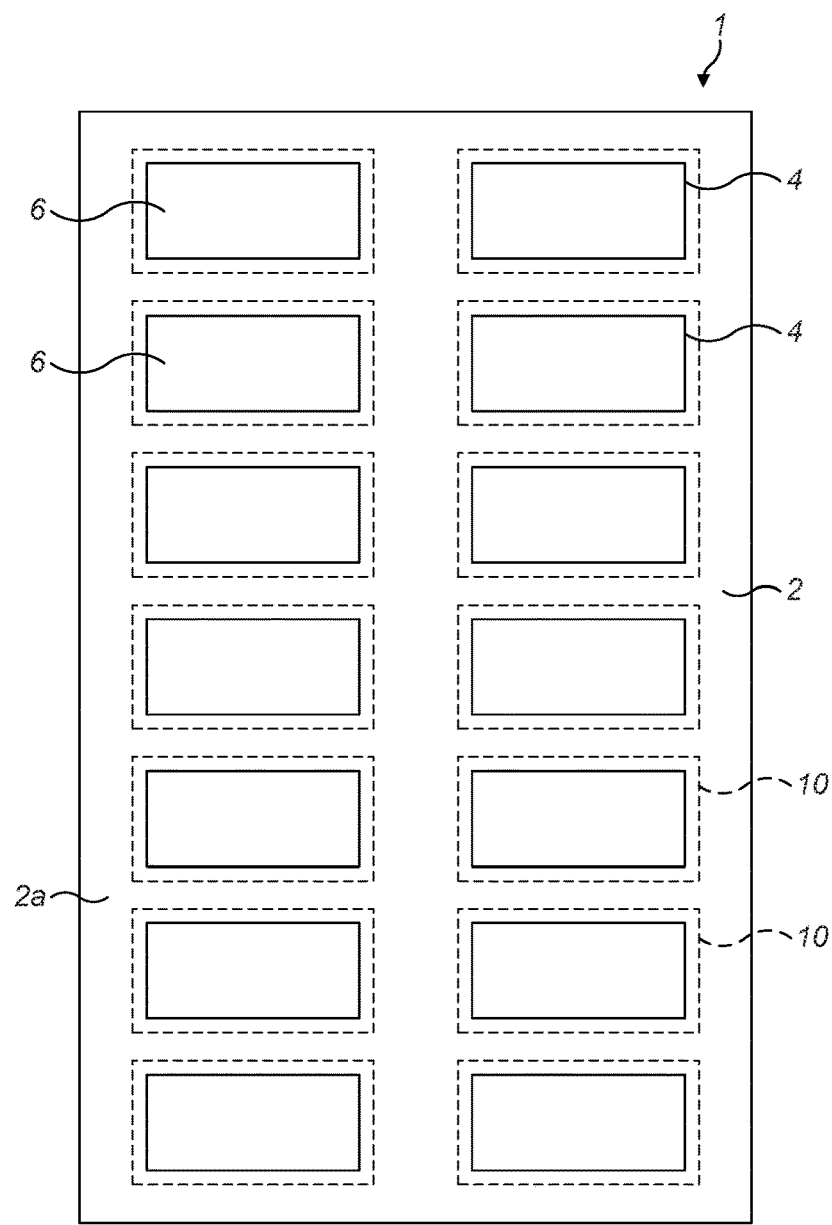
FIG. 1 is a top view of a seal according to the present invention.
Figure 2:
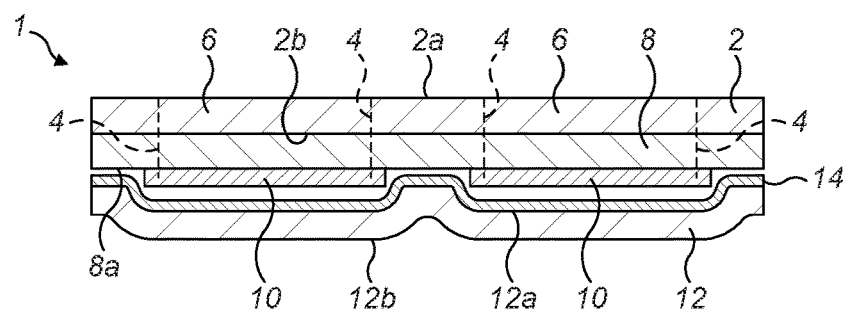
FIG. 2 is a cross section view of the seal of FIG. 1.

A seal 1 is shown in FIGS. 1 and 2 includes a cover layer 2 of single or multiple-layer construction. The cover layer 2 includes pre-formed lines of separation 4 defining a 7×2 array of releasable portions 6. Although shown as a continuous, unbroken line, each line of separation 4 can be a tear line (e.g., a perforation line) that must be torn or broken to release the releasable portion from the remainder of the cover layer 2 or a cut line. A perforation line will include a series of cut lines and ties. Although not shown, each releasable portion can be attached to the remainder of the cover layer by a bridge region defined by a gap in the associated pre-formed line of separation. Each releasable portion will remain attached to the cover layer by means of the bridge region when it separates along the associated line of separation to define a "flap". This might be considered to be more environmentally friendly because the individual releasable portions do not become fully detached from the cover film and do not need to be discarded each time the contents of a cavity are dispensed.

An upper surface 2a of the cover layer 2 defines an upper surface of the seal 1.

An adhesive layer 8 is applied to a lower surface 2b of the cover layer 2.

A 7×2 array of patches 10 consisting of hot melt polymer are applied to a lower surface 8a of the adhesive layer 8. Each patch 10 is aligned with a respective releasable portion 6 as shown. As described in more detail below, the patches 10 are applied to the adhesive layer 8 using a spraying process and are sized and shaped to be larger than the respective releasable portions 6. Each patch 10 is therefore also adhered to an overlapping region of the cover film between the pre-formed line of separation 4 in the cover film 2 and the periphery of the patch.

The patches 10 can have a thickness in the range of about 18 to about 37 μm, for example.

The seal 1 further comprises a backing layer 12. A release coating 14 is applied to an upper surface 12a of the backing layer 12. The release coating 14 is adhered to the adhesive layer 8 and contacts the patches 10. A lower surface 12b of the backing layer 12 defines a lower surface of the seal 1.

The pre-formed lines of separation 4 (i.e., the perforation lines or cut lines) extend completely through the cover layer 2 and the adhesive layer 8. They can also extend partly into the patches 10—as shown in FIG. 2—as long as the patches retain their structural integrity and moisture-barrier properties. If the pre-formed lines of separation 4 are cut lines, it will be readily understood that the releasable portions 6 are kept in position by the patches 10 which are larger than the releasable portions.

Figure 3:
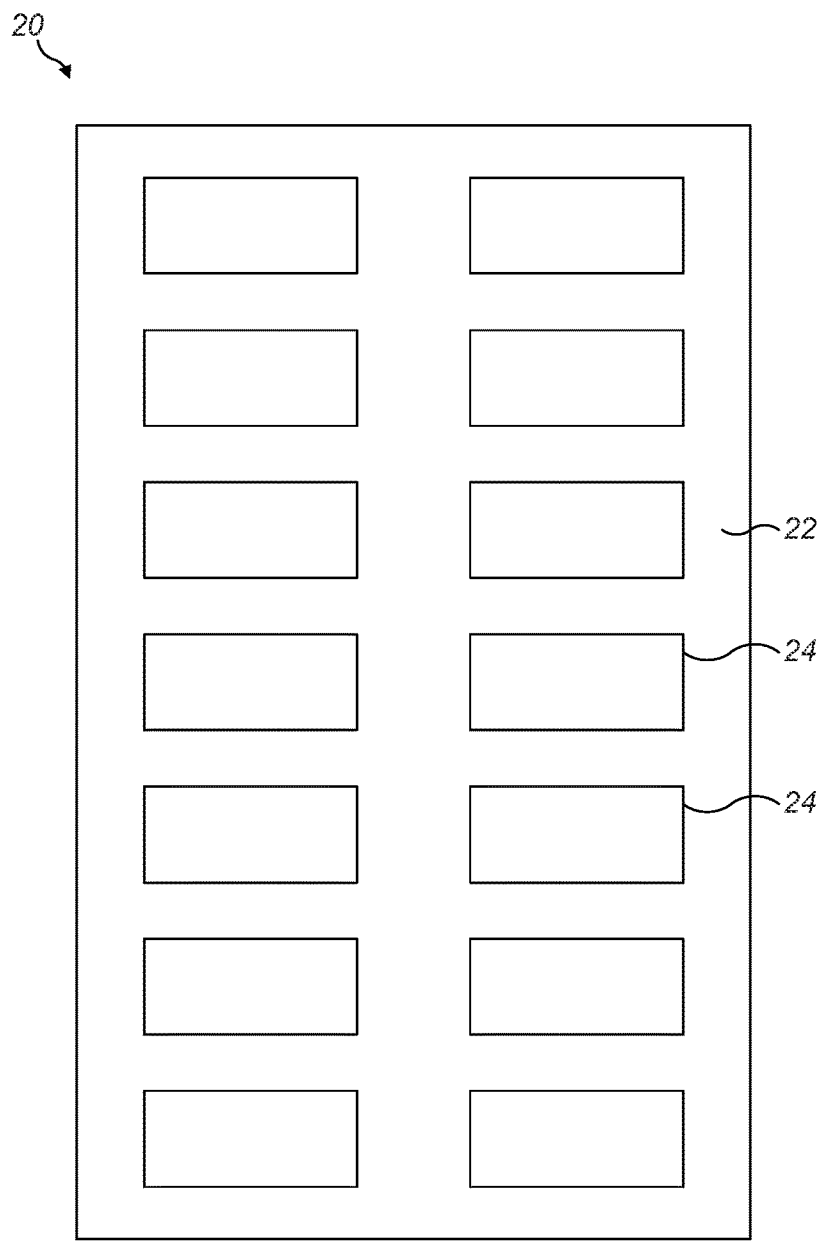
FIG. 3 is a top view of a moulded tray.
Figure 4:
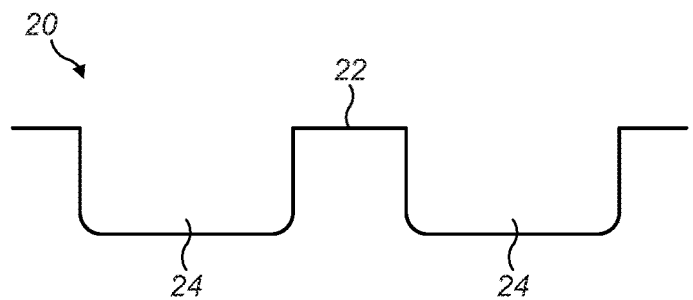
FIG. 4 is a cross section view of the tray of FIG. 3.

FIGS. 3 and 4 show a moulded tray 20 having a generally planar top surface 22 into which has been formed a 7×2 array of discrete cavities 24 for receiving consumer products.

Figure 5:
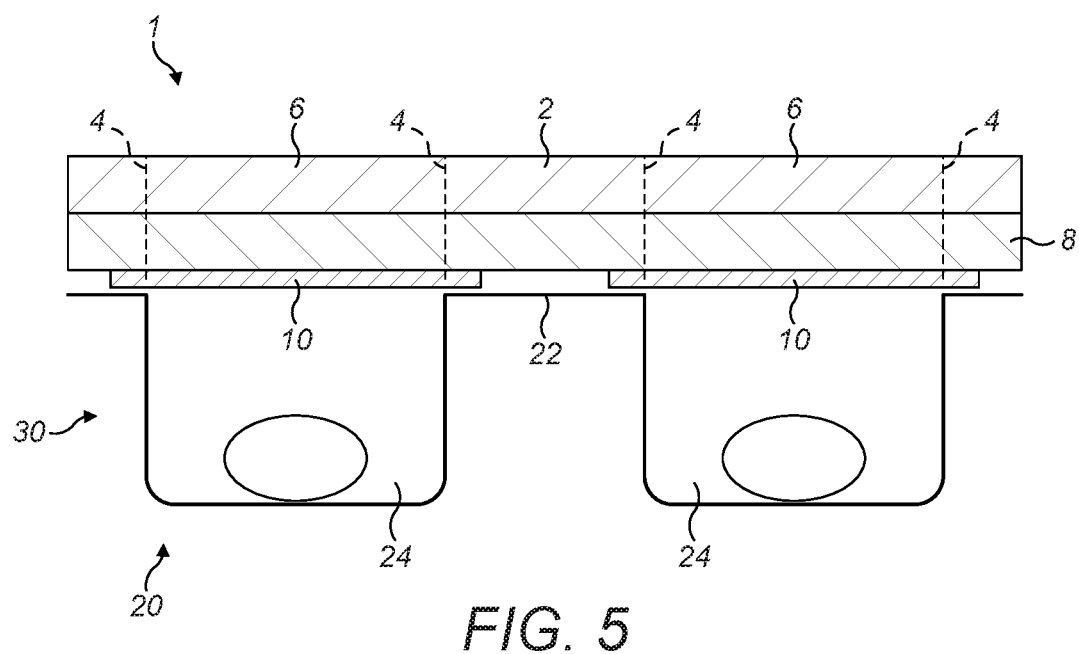
FIG. 5 is a cross section view of a multiple-compartment dispensing container according to the present invention that includes the seal shown in FIGS. 1 and 2 and the moulded tray shown in FIGS. 3 and 4.

A container 30 for storing and dispensing consumer products is shown in FIG. 5. The backing layer 12 and its integral release layer 14 of the seal 1 have been peeled away from the adhesive layer 8 and the cover layer 2 is shown adhered to the generally planar top surface 22 of the tray 20 using the exposed adhesive layer with the open mouths of the discrete cavities 24 being covered by the patches 10 and releasable portions 6. The releasable portions 6 are the same size as the open mouths of the discrete cavities 24. The patches 10 are larger than the open mouths of the discrete cavities 24 and prevent the consumer products in the discrete cavities from coming into contact with, and sticking to, the adhesive layer 8. The patches 10 also provide moisture-barrier (or vapour-barrier) properties by increasing the thickness of the cover layer 2 in the region overlying the open mouths of the discrete cavities 24 and by forcing any moisture that travels through the lines of separation 4 to travel outwardly through the adhesive layer 8 to reach the outer peripheral edge of each patch before it can enter the discrete cavities.

To dispense the contents of a particular cavity, the user simply presses down on the overlying releasable portion 6. If the line of separation 4 is a tear line (e.g., a perforation line) the application of a sufficient amount of force will cause it to tear such that the releasable portion 6 is fully released from the remainder of the cover layer 2 or partially released apart from in the bridge region. If there is a bridge region it will act as a hinge to allow the attached releasable portion (or "flap") to bend downwardly into the cavity or upwardly to allow the contents of the cavity to be dispensed through the opening created in the cover layer 2. The associated patch 10 of hot melt polymer will break or rupture—typically in a line that corresponds generally to the line of separation 4. This is particularly the case if the line of separation extends partly into the patch as shown in FIG. 2. In some cases, an inner part of the patch 10 may be removed along with the releasable portion 6 and an outer peripheral part of the patch may remain adhered to the underside of the cover layer 2.

Figure 6:
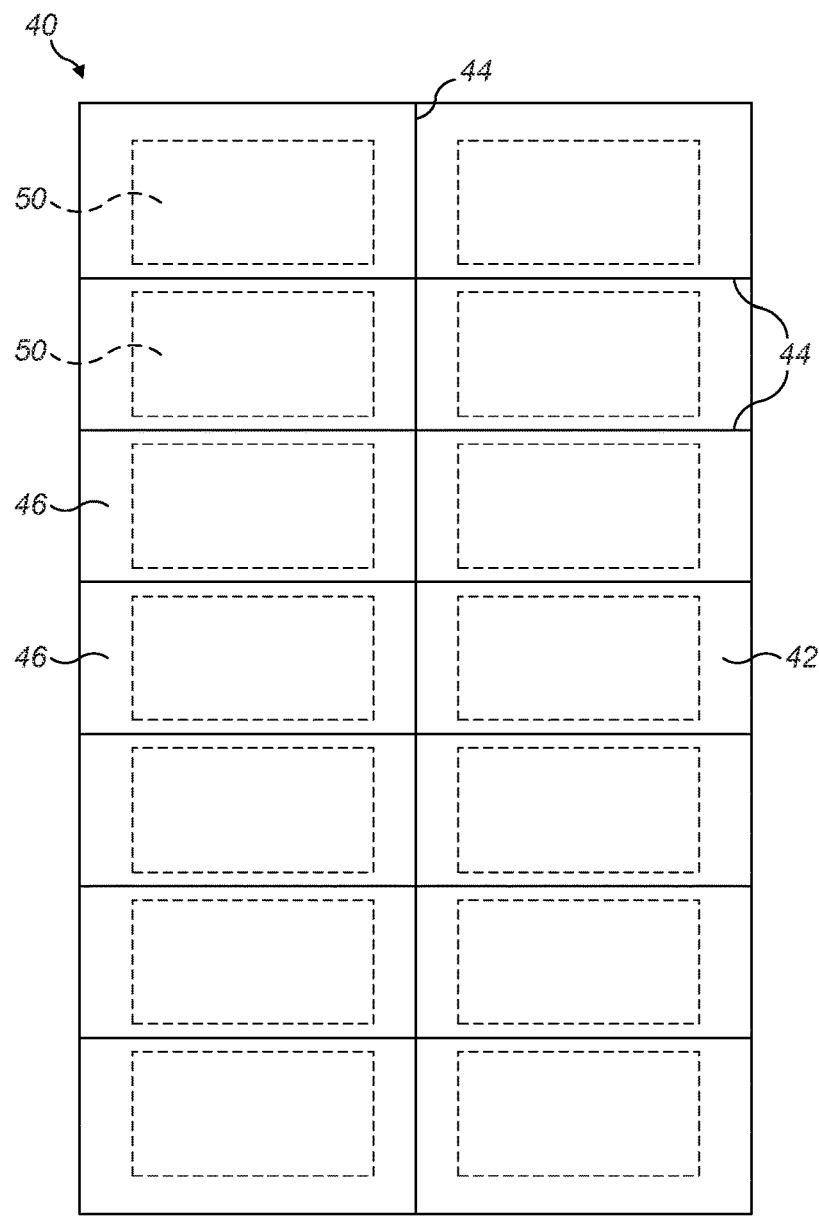
FIG. 6 is a top view of an alternative seal according to the present invention.
Figure 7:
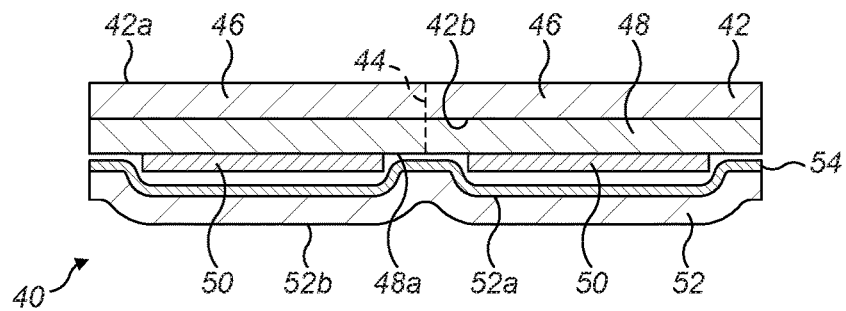
FIG. 7 is a cross section view of the alternative seal of FIG. 6.

An alternative seal 40 is shown in FIGS. 6 and 7 and includes a cover layer 42 of single or multiple-layer construction. The cover layer 42 includes pre-formed lines of separation 44 defining a 7×2 array of releasable portions 46. Although shown as a continuous, unbroken line, each line of separation 44 is a tear line (e.g., a perforation line defined by a series of cuts and ties) that must be torn or broken to release the releasable portion from the remainder of the cover layer 42. In the alternative seal 40, some of the pre-formed lines of separation 44 are shared by adjacent releasable portions as shown.

An upper surface 42a of the cover layer 42 defines an upper surface of the alternative seal 40.

An adhesive layer 48 is applied to a lower surface 42b of the cover layer 42. The lines of separation 44 (e.g., perforation lines) extend completely through the cover layer 42 and the adhesive layer 48 as shown.

A 7×2 array of patches 50 consisting of hot melt polymer are applied to a lower surface 48a of the adhesive layer 48. Each patch 50 is aligned with a respective releasable portion 46 as shown. As described in more detail below, the patches 50 are applied to the adhesive layer 48 using a spraying process and are sized and shaped to be smaller than the respective releasable portions 46.

The patches 50 can have a thickness in the range of about 18 to about 37 µm, for example.

The alternative seal 40 further comprises a backing layer 52. A release coating 54 is applied to an upper surface 52a of the backing layer 52. The release coating 54 is adhered to the adhesive layer 48 and contacts the patches 50. A lower surface 52b of the backing layer 52 defines a lower surface of the seal 40.

Figure 8:
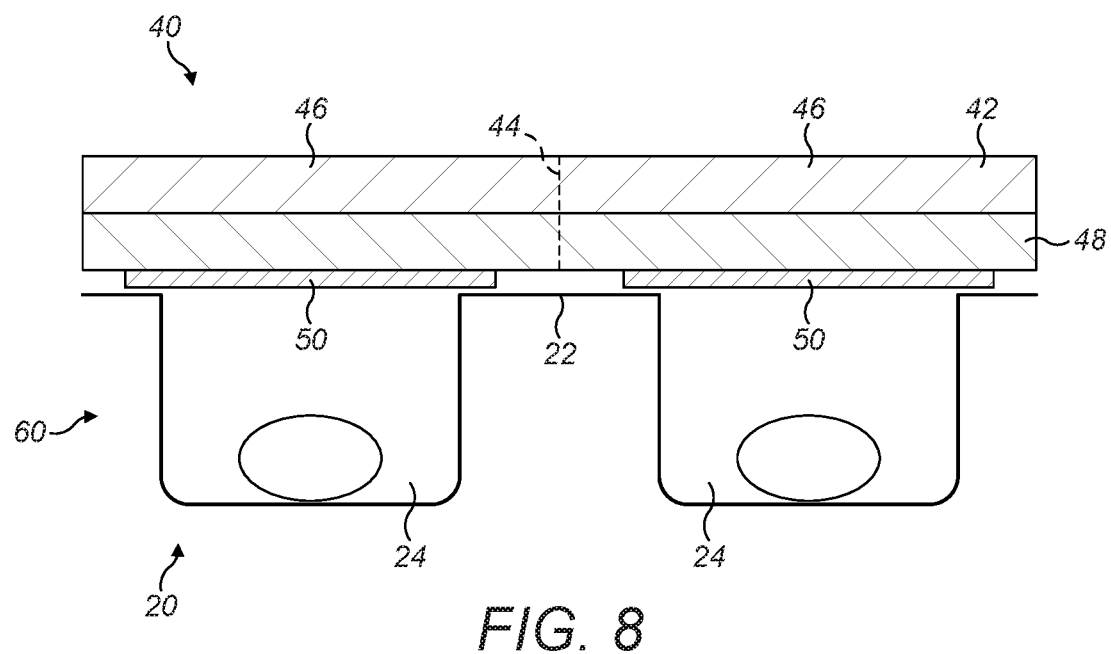
FIG. 8 is a cross section view of an alternative multiple-compartment dispensing container according to the present invention that includes the alternative seal shown in FIGS. 5 and 6 and the moulded tray shown in FIGS. 3 and 4.

A container 60 for storing and dispensing consumer products is shown in FIG. 8. The backing layer 52 and its integral release layer 54 of the alternative seal 40 have been peeled away from the adhesive layer 48 and the cover layer 42 is shown adhered to the generally planar top surface 22 of the tray 20 using the exposed adhesive layer with the open mouths of the discrete cavities 24 being covered by the patches 50 and releasable portions 46. The releasable portions 46 are larger than the open mouths of the discrete cavities 24 and the lines of separation 44 are positioned over the generally planar top surface 22 of the tray 20. Corresponding lines of separation (not shown) may be provided in the generally planar top surface of the tray to allow the discrete cavities to be separated from the remainder of the tray, each discrete cavity retaining its own releasable portion 46. The patches 50 are also larger than the open mouths of the discrete cavities 24 and prevent the consumer products in the discrete cavities 24 from coming into contact with, and sticking to, the adhesive layer 48. The patches can also be the same size as, or smaller than, the open mouths of the discrete cavities. The patches 50 provide moisture-barrier properties by increasing the thickness of the cover layer 42 in the region overlying the open mouths of the discrete cavities 24 and by forcing any moisture that travels through the lines of separation 44 to travel inwardly through the adhesive layer 48 to reach the open mouths of the discrete cavities. In other words, there is no direct path for moisture to travel from the outside environment to the discrete cavities.

Figure 9:
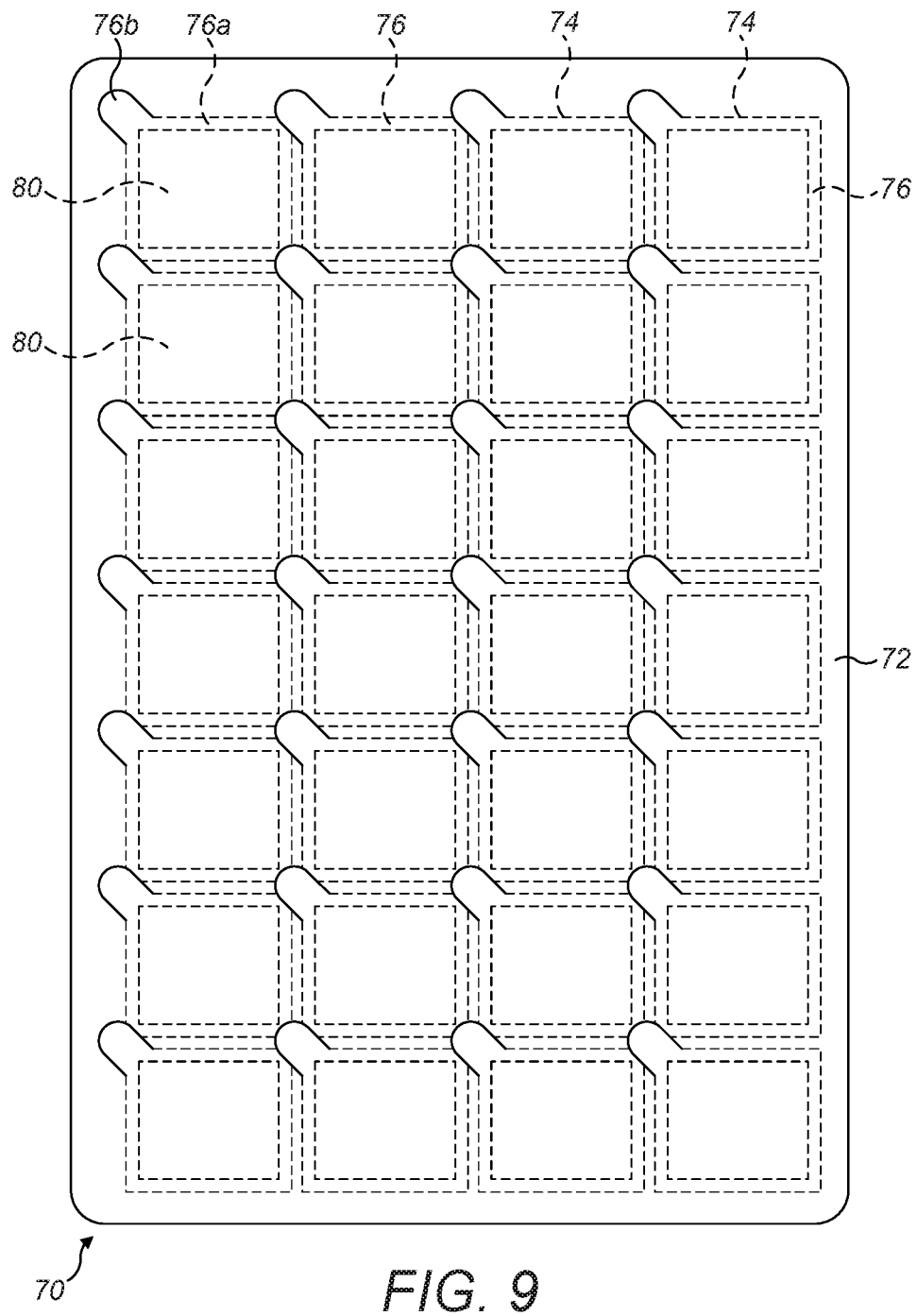
FIG. 9 is a top view of another alternative seal according to the present invention.
Figure 10:
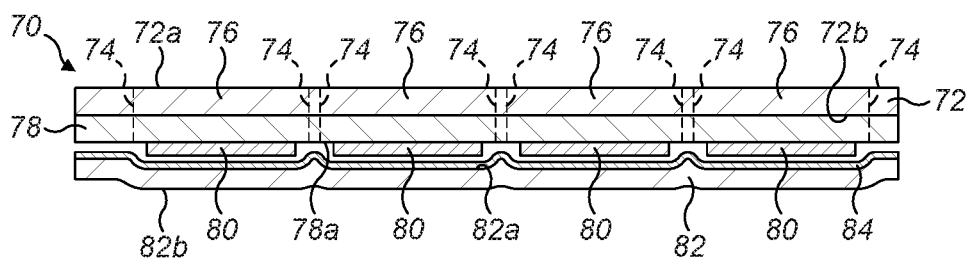
FIG. 10 is a cross section view of the alternative seal of FIG. 9.

Another alternative seal 70 is shown in FIGS. 9 and 10 and includes a cover layer 72 of single or multiple-layer construction. The cover layer 72 includes pre-formed lines of separation 74 defining a 7×4 array of releasable portions 76. Each releasable portion 76 includes a main portion 76a and a tab portion 76b extending from the main portion that can be grasped preparatory to releasing the releasable portion from the remainder of the cover layer 72. The lines of separation 74 defining the main portions 76 are tear lines (e.g., perforation lines defined by a series of cuts and ties) that must be torn or broken to release the releasable portion and are shown as dashed lines. The tab portions 76b are defined by cut lines that are shown as continuous, unbroken lines.

An upper surface 72a of the cover layer 72 defines an upper surface of the alternative seal 70.

An adhesive layer 78 is applied to a lower surface 72b of the cover layer 72. The lines of separation 74 extend completely through the cover layer 72 and the adhesive layer 78 as shown.

A 7×4 array of patches 80 consisting of hot melt polymer are applied to a lower surface 78a of the adhesive layer 78. Each patch 80 is aligned with a respective releasable portion 76 as shown. As described in more detail below, the patches 80 are applied to the adhesive layer 78 using a spraying process and are sized and shaped to be smaller than the respective releasable portions 76.

The alternative seal 70 further comprises a backing layer 82. A release coating 84 is applied to an upper surface 82a of the backing layer 82. The release coating 84 is adhered to the adhesive layer 78 and contacts the patches 80. A lower surface 82b of the backing layer 82 defines a lower surface of the seal 70.

The alternative seal 70 is adhered to the generally planar top surface of a tray with a corresponding 7×4 array of discrete cavities in the same way as the seals described above.

Figure 11:
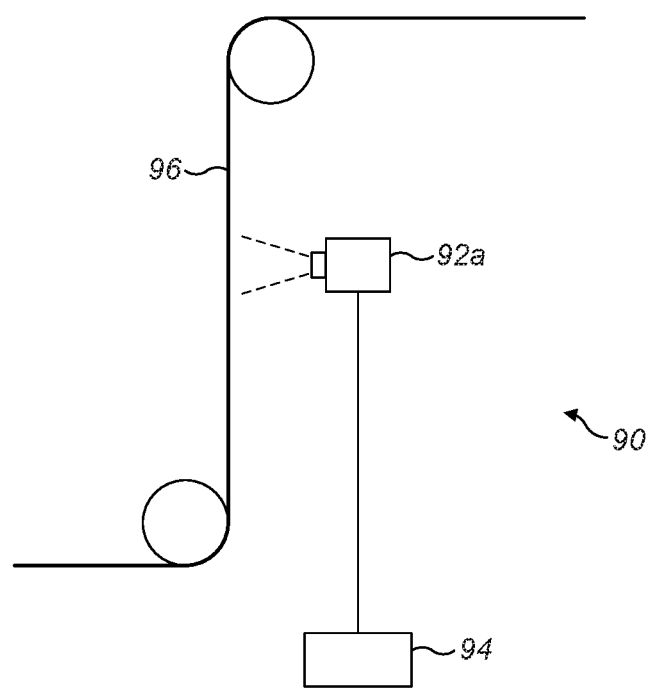
FIG. 11 is a side view of a spraying apparatus.
Figure 12:
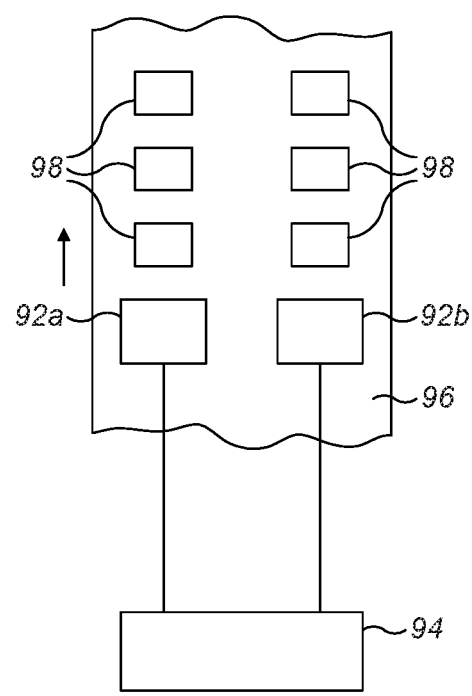
FIG. 12 is a rear view of the spraying apparatus of FIG. 11.

In the case of each of the seals described above, the respective patches are applied to the adhesive layer using a spraying process for hot melt polymers. FIGS. 11 and 12 show a spray apparatus 90 with a pair of stationary spray heads 92a, 92b arranged side by side. The spray heads 92a, 92b are connected to a supply 94 of hot melt polymer. A substrate 96 is moved past the stationary spray heads 92a, 92b by a transfer roller system. The substrate 96 represents the cover layer and the applied adhesive layer. (The backing layer is adhered to the substrate later.) The substrate 96 may have already undergone a suitable cutting process to pre-form the lines of separation in the cover layer that define an array of releasable portions. The substrate 96 may also undergo a suitable cutting process after the patches have been applied to the adhesive layer. As the substrate 96 moves past the spray heads 92a, 92b, the spray heads are controlled to spray hot melt polymer onto the adhesive layer of the substrate to define two columns of discrete patches 98 as shown in FIG. 12. If the spray apparatus includes more than two spray heads arranged side by side, it will be readily understood that additional columns of discrete patches can be sprayed onto the adhesive layer as the substrate moves past. For example, in the case of the alternative seal 70 shown in FIGS. 9 and 10, the spray apparatus will include four spray heads arranged side by side so that four columns of patches are sprayed onto the adhesive layer of the substrate.

Any suitable hot melt polymer can be used, for example, a food-grade hot melt adhesive based on ethylene-vinyl acetate (EVA), polyurethanes or functional polyolefins. One suitable hot melt adhesive which uses high-performance polyolefins is KIZEN FORCE 2.0 available from Bostik Ltd, Stafford, United Kingdom, which has an application temperature of 160°-180° C., a white aspect, and a Brookfield viscosity of 1220 m·Pa·s at 170° C.

Several variants of the illustrated embodiments have been described above. In the absence of any contrary statement, each variant can be adopted independently of the others and they can be used in any combination.

The entire contents of all references cited in this disclosure are incorporated herein in their entireties, by reference. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether such ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A multi-layer product comprising:
 a first layer having pre-formed lines of separation defining one or more first portions;
 an adhesive layer on the first layer;
 one or more patches on the adhesive layer, each patch being associated with a respective one of the one or more first portions, consisting of a hot melt polymer, and providing moisture-barrier properties;
 a second layer; and
 a release layer on the second layer and between the second layer and the adhesive layer including the one or more patches thereon, wherein
 the adhesive layer includes one or more areas with the one or more patches thereon, and one or more areas that are free of patches,
 for the one or more areas of the adhesive layer that include the one or more patches thereon, the multi-layer product consists of five layers, and
 for the one or more areas of the adhesive layer that are free of patches, the multi-layer product consists of four layers.

2. The multi-layer product of claim 1, wherein each pre-formed line of separation in the first layer is formed by a pre-scored or pre-perforated tear line, a cut line, or a combination thereof.

3. The multi-layer product of claim 1, wherein each patch is larger than the associated first portion of the first layer.

4. The multi-layer product of claim 1, wherein each patch has a thickness in the range of about 10 to about 50 μm.

5. The multi-layer product of claim 1, wherein the hot melt polymer is a food-grade polymer.

6. A multi-layer product comprising:
 a first layer having pre-formed lines of separation defining one or more first portions;
 an adhesive layer on the first layer;
 one or more patches on the adhesive layer, each patch being associated with a respective one of the one or more first portions, consisting of a hot melt polymer, and providing moisture-barrier properties;
 a second layer; and
 a release layer; wherein
 the one or more first portions comprises an array of first portions, the one or more patches comprises an array of patches, the adhesive layer including the array of patches applied thereon comprises areas of the adhesive layer covered by the patches and areas of the adhesive layer that surround the patches and are not covered by the patches,
 the release layer is disposed on the second layer and between the second layer and the adhesive layer including the array of patches applied thereon, the release layer covers and contacts the patches in the areas of the adhesive layer covered by the patches, the release layer covers and contacts the areas of the adhesive layer that surround the patches and are not covered by the patches, for the one or more areas of the adhesive layer covered by the patches, the multi-layer product consists of five layers, and for the one or more areas of the adhesive layer that are not covered by the patches, the multi-layer product consists of four layers, and the second layer is configured to be peeled away, with the release layer, to expose the adhesive layer and the array of patches, thus enabling the first layer including the array of patches to be adhered to a generally planar surface at the areas of the adhesive layer that surround the patches and are not covered by the patches.

\* \* \* \* \*